United States Patent
Cho et al.

(10) Patent No.: US 6,511,793 B1
(45) Date of Patent: Jan. 28, 2003

(54) METHOD OF MANUFACTURING MICROSTRUCTURE USING PHOTOSENSITIVE GLASS SUBSTRATE

(75) Inventors: Soo-Je Cho, Seoul (KR); Byung-Gil Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/533,860

(22) Filed: Mar. 24, 2000

(30) Foreign Application Priority Data

Mar. 24, 1999 (KR) ............................................ 99-10138
Aug. 30, 1999 (KR) ............................................ 99-36236

(51) Int. Cl.[7] .......................... G03C 5/56; C03C 15/00; C03C 25/68; C03C 25/66
(52) U.S. Cl. ...................... 430/323; 430/322; 430/325; 430/311; 430/317; 216/41; 216/80; 216/99; 216/100
(58) Field of Search .................. 430/311, 325; 216/41, 100

(56) References Cited

U.S. PATENT DOCUMENTS 3,797,935 A * 3/1974 Marcy .......................... 355/53
4,684,222 A * 8/1987 Borrelli et al. ............. 350/420
5,470,681 A * 11/1995 Brunner et al. ............. 430/313
5,997,377 A * 12/1999 Sagara et al. ................. 445/24
6,246,825 B1 * 6/2001 Kershaw ....................... 385/132

* cited by examiner

Primary Examiner—Mark F. Huff
Assistant Examiner—Daborah Chacko-Davis
(74) Attorney, Agent, or Firm—Fleshner & Kim, LLP

(57) ABSTRACT

The present invention relates to a method of manufacturing a microstructure such as a barrier lib or a spacer formed at an internal space between two flat panels constructing a flat panel display and, in particular, to a method of manufacturing a microstructure using a photosensitive glass substrate. The method of manufacturing a microstructure in accordance with the present invention includes the steps of preparing a photosensitive glass substrate, forming a mask pattern having a light transmission unit and a shading unit on the photosensitive glass substrate, exposing the photosensitive glass substrate, heat-treating the photosensitive glass substrate, and etching an unexposed portion of the photosensitive glass substrate. In addition, the process of changing the thermal expansive coefficient of the microstructure by heat-treating the photosensitive substrate again can be additionally included after etching and removing the unexposed portion.

18 Claims, 4 Drawing Sheets

METHOD OF MANUFACTURING MICROSTRUCTURE USING PHOTOSENSITIVE GLASS SUBSTRATE

BACKGROUND OF THE INVENTION

1. Field of the Invention

The present invention relates to a method of manufacturing a microstructure such as a barrier lib or a spacer formed at an internal space between two flat panels constructing a flat panel display and, in particular, to a method of manufacturing a microstructure using a photosensitive glass substrate.

2. Description of the Background Art

Recently, flat panel displays (FPD) playing a major role in a man-machine interface, such as liquid crystal displays (LCD), field emission displays (FDD), plasma display panels (PDP), plasma address liquid crystal displays(PALC) are having been actively developed. Each of the above-described flat panel displays commonly includes two flat panels, each being arranged at a certain distance from each other, and a plurality of pixels formed between the two flat panels. In addition, the displays have something in common in that an internal space of the display formed between the two flat panels has to maintain a lower pressure than an external air pressure and the size of the internal spacer has to be maintained constant. For this purpose, it is necessary to manufacture a microstructure member such as a barrier lib or a spacer between the two flat panels, in order to prevent a damage to the panels due to a difference between the pressure in the internal space of the flat panel display and the external air pressure, and maintain the thickness of the internal space constant.

For a method of manufacturing a barrier lib applied to the manufacture of PDP and PALC in this microstructure member, screen printing method, sand blasting method, molding method, etc. are proposed. However, there have been many problems in those methods.

In case of the screen printing method, there is a problem that it takes much time for manufacturing a barrier lib because the method requires a process of repeating printing and drying several times, and it is difficult to form a high definition barrier lib because the shape of the barrier lib is distorted when a screen alignment is not performed well.

In case of the sand blasting method, there is a problem that since a barrier lib is manufactured by abrading the panel using polishing particles, the material of the panel is wasted and accordingly the manufacturing cost is high, and since the panel is shocked by the polishing particles, it is likely to lead a damage to the panel.

The molding method is forming a barrier lib by putting a mold on a semi-solid phased film, a material for the barrier lib, or a paste and applying a uniform pressure to the mold. However, there is a problem that it is difficult to manufacture a barrier lib of an uniform height and separate the mold and the barrier lib because it is difficult to apply a uniform pressure to the mold.

Besides, LIGA (Lithography, Electroplating and Molding), silicon anistrophic etching, photosensitive glass substrate etching, etc. are newly proposed as another method of manufacturing a microstructure.

However, there is a problem that the LIGA requires a high-priced equipment because X-rays has to be generated by the method.

In addition, the silicon anistrophic etching is a method of performing anistrophic etching after forming a mask pattern on a silicon single crystal substrate. However, there is a problem that since it is difficult to etch a large area at an uniform depth, it is difficult to manufacture a microstructure of an uniform height, and since the price of the silicon single crystal substrate is very high, the manufacturing cost is high.

The photosensitive glass substrate etching among the conventional methods of manufacturing a microstructure will now be described in brief.

Firstly, as illustrated in FIG. 1A, a photosensitive glass substrate 2 is prepared. The photosensitive glass substrate 2 is mainly composed of $SiO_2$ and $Li_2O$, including a small amount of $CeO_2$ and $Al_2O_3$ and a small amount of photosensitive metals such as Au, Ag and Cu. Besides, other oxides may be included as the needs arise.

Next, as illustrated in FIG. 1B, a mask pattern 4 is put on the photosensitive glass substrate 2, and ultraviolet rays are irradiated on a portion not covered with the mask pattern 4. Generally, the energy for irradiating ultraviolet rays on a photosensitive glass substrate 2 with a thickness of 1 mm is approximately $2J/cm^2$ when the wavelength of the ultraviolet rays is 310 nm.

In the glass substrate 2 exposed to ultraviolet rays for a predetermined time, as trivalent Ce ions are changed into tetravalent Ce ions at an exposed portion, electrons are released into the glass substrate 2.

Next, the mask pattern 4 on the glass substrate 2 is removed and the glass substrate 2 is heat-treated at a temperature of 350° C. for about 30 minutes. The electrons react with photosensitive metal ions at the exposed portion of the glass substrate 2 to thereby deposit metal elements.

Next, the glass substrate 2 from which the metal elements are deposited is heat-treated at a temperature of 570° C. for 2~3 hours. Then, as illustrated in FIG. 1C, crystal phases such as $SiO_2$, $Li_2O$, etc. are formed around metals using the metals as the core at the exposed portion (D1) of the photosensitive glass substrate 2. In other words, the exposed portion (D1) is a mixed structure of amorphous and crystal phases, and the percentage of crystal phases is about 25%. Meanwhile, an unexposed portion has an amorphous structure.

Next, when the glass substrate 2 is dipped in an aqueous solution including HF for a predetermined time, the exposed portion (D1) having the mixed structure of crystal phases is dissolved and then removed to thereby have a structure in FIG. 1D.

The above-described photosensitive glass substrate etching is a method of removing the exposed portion using the etching selectivity between the crystallized exposed portion and the unexposed portion, and, in particular, the method of removing the exposed portion thus described is referred to as positive etching. The above positive photosensitive glass substrate etching is widely utilized in forming a barrier lib of FED, PDP and PALC and an exposure of an inkjet head. It is also possible to form a hole with a diameter of 60 $\mu$m on a glass substrate with a thickness of 200 $\mu$m using the positive photosensitive glass substrate etching.

However, in the positive photosensitive glass substrate etching, there is a disadvantage that it is difficult to obtain a microstructure of a desired shape if the deposition degree of crystal phases at the exposed portion is not sufficient, so that heat treatment and etching have to be repeated in order to deposit sufficient crystal phases, thus making the process complicated and requiring a lot of time, although the method has an advantage that it is less expensive. That is, in a case where the percentage of crystal phases is about 25% in the structure of the exposed portion, the etching selectivity between the. exposed portion and the unexposed portion is not high, so that the exposed portion is not etched well and thus residuals remain at the exposed portion. Therefore, in case of manufacturing a microstructure having a high aspect ratio, there arises a problem that it is difficult to form a hole of a uniform size and the shape of a side wall of the microstructure is distorted.

Accordingly, there arises a problem that it is difficult to manufacture a microstructure with high reliability. In addition, the thermal expansive coefficient of a microstructure using a photosensitive glass substrate in the conventional art is about $7.5 \times 10^{-6}$. Generally, the microstructure is adhered to the substrate or a dielectric layer having a natural thermal expansive coefficient. However, the thermal expansive coefficient of glass most frequently used as a substrate for a flat panel display is $8.3 \sim 8.6 \times 10^{-6}$ in general. In case of a metal substrate frequently used as a material replacing the glass recently has a higher thermal expansive coefficient. Therefore, in a case where the difference in thermal expansive coefficient between the microstructure and the substrate to. be adhered to the microstructure, the. adhesion is not easily performed and there is a possibility that the microstructure or the substrate could be damaged.

SUMMARY OF THE INVENTION

Accordingly, it is an object of the present invention to provide a method of manufacturing a microstructure having a high aspect ratio.

It is another object of the present invention to provide a method of manufacturing a microstructure with high reliability in which no residuals remains after etching.

It is another object of the present invention to provide a method of manufacturing a microstructure by only one exposure and heat treatment by increasing the etching selectivity between an exposed portion and an unexposed portion.

It is another object of the present invention to provide a method of manufacturing a microstructure by which the step for controlling the thermal expansive coefficient of the microstructure in order to match with the thermal expansive coefficient of other materials is additionally carried out.

The method of manufacturing a microstructure in accordance with the present invention includes the steps for: forming a mask pattern on a photosensitive glass substrate; exposing the photosensitive glass substrate at an energy of $20J/cm^2$; changing an unexposed portion of the photosensitive substrate to a crystalline structure by removing the mask pattern and heat-treating the photosensitive glass substrate to a predetermined temperature; and removing the unexposed portion by selectively etching the same.

Additional advantages, objects and features of the invention will become more apparent from the description which follows.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Th preferred embodiments of the present invention will be described in detail with reference to FIGS. 2A through 2D.

Figure 1A:
FIGS. 1A through 1D illustrate a sequence of a manufacturing process of a microstructure in the conventional art.
Figure 1B:
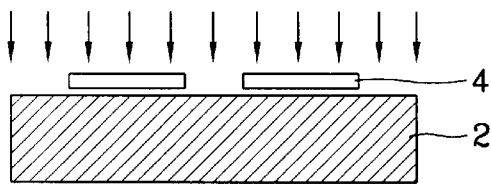
Figure 1C:
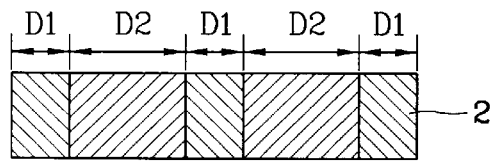
Figure 1D:
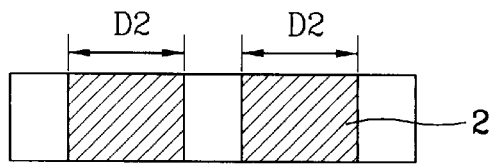
Figure 2A:
FIGS. 2A through 2D illustrate a sequence of a manufacturing process of a microstructure in accordance with the present invention.

As illustrated in FIG. 2A, a photosensitive glass substrate 12 is prepared. Referring to FIG. 5A, a photosensitive glass substrate 102 containing a small amount of $CeO_2$ and $Al_2O_3$ and a small amount of photosensitive metals such as Au, Ag and Cu. This photosensitive glass substrate 102 is composed of 70~90% $SiO_2$, 5~15% $LiO_2$, 5~15% $Al_2O_3$, 0~5% $Na_2O$, 0~5% $K_2O$, 0.01~0.3% $CeO_2$, 0~1% ZnO, 0~0.5% AgO, 0~0.5% Cu2O, 0~0.1% $SnO_2$, and 0~0.2% Au.

Figure 2B:
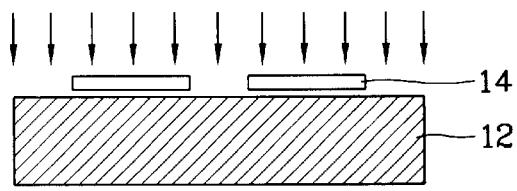

Next, as illustrate in FIG. 2b, a mask pattern 14 having a light transmission unit for transmitting light and a shading unit for shading light is put on the photosensitive glass substrate 12, and the photosensitive glass substrate 12 is exposed to ultraviolet rays of 310 nm. At this time, the exposure energy is set to $20J/cm^2$, which is about 10 times the exposure energy as in the conventional positive etching, on the basis of the above ultraviolet rays of 310 nm. The photosensitive glass substrate is partially exposed though the light transmission unit of the mask pattern 14.

Figure 2C:
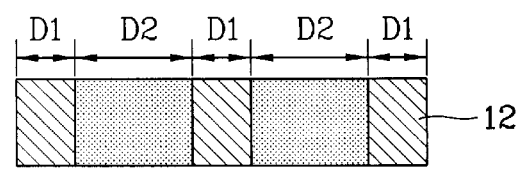
Figure 3A:
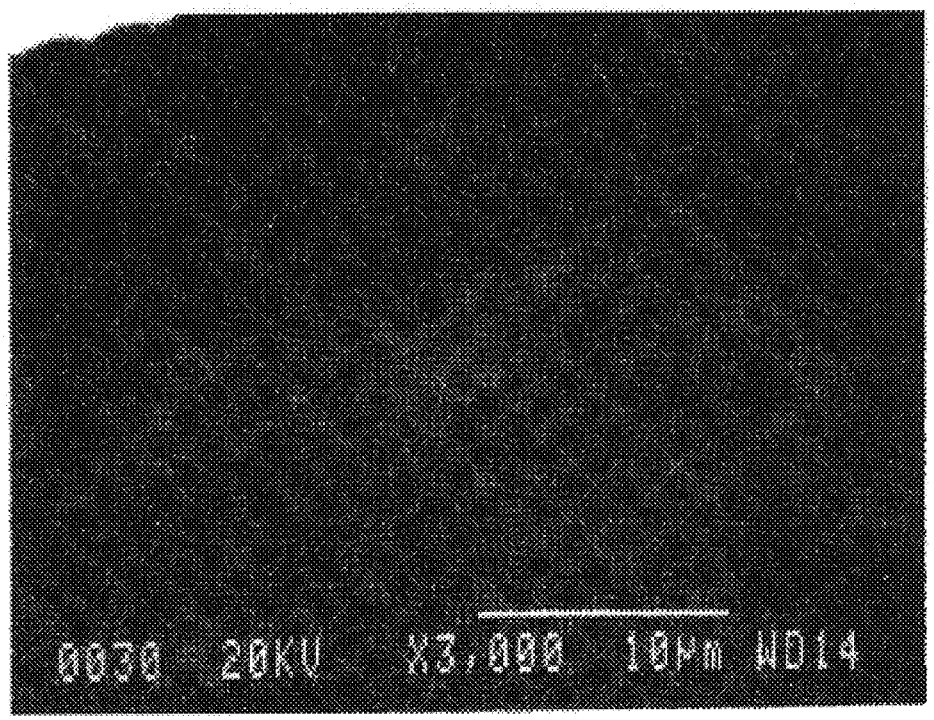
FIGS. 3A and 3B are Scanning Electron Microscopy (SEM) photos illustrating structures of an unexposed portion (D2) and an exposed portion (D1), respectively, of a photosensitive glass substrate after heat treatment in a manufacturing process of a microstructure in accordance with the present invention.
Figure 3B:
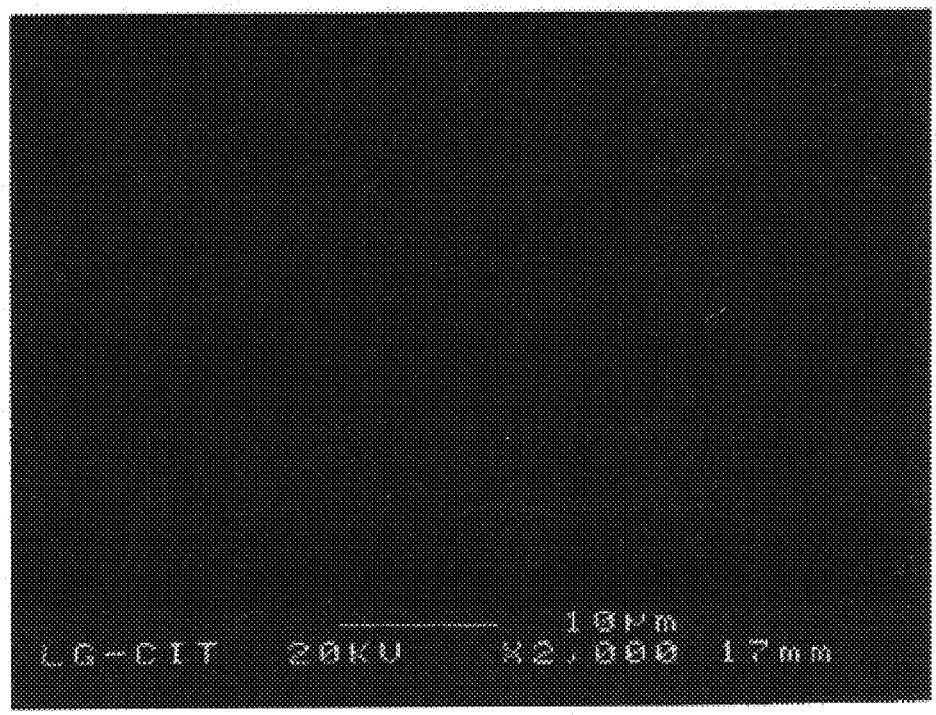

Next, as illustrated in FIG. 2c, the mask pattern 104 is removed, and the photosensitive glass substrate 12 is heat-treated at a temperature of about 600~650° C. for 50~90 minutes. By this heat treatment, the structures of an exposed portion (D1) and an unexposed portion (D2) on the photosensitive glass substrate 12 are changed. That is, the unexposed portion (D2) has a defective structure, and the exposed portion (D1) has a compact structure. FIGS. 3A and 3B are SEM (Scanning Electron Microscopy) photos illustrating the structures of the unexposed portion (D2) and the exposed portion (D2), respectively, after heat treatment. The difference between the structures of the exposed portion (D1) of FIG. 3B and the unexposed portion (D2) of FIG. 3A can be shown. That is, as a result of increasing the exposure energy by about 10 times as compared to the conventional art, the structure of the photosensitive substrate at the exposed portion and the unexposed portion is formed differently.

Next, as a result of dipping the photosensitive glass substrate 12 in an aqueous solution containing HF for a predetermined time, the unexposed portion (D2) having a lot of defects is etched and removed and thereby the structure as in FIG. 2C is manufactured. That is, since the unexposed portion (D2) has a structure with a lot of defects, the aqueous solution is easily intruded into the structure to thereby dissolve and remove the unexposed portion (D2) with ease. On the contrary, the exposed portion (D1) having a relatively compact structure is etched at a low speed, so that it remains without being removed.

Figure 2D:
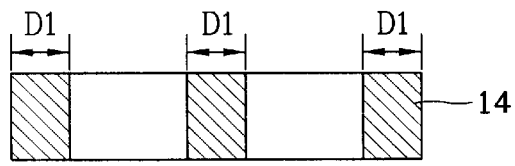

The microstructure manufactured as illustrated in FIG. 2D has a thermal expansive coefficient of about $7.5 \times 10^{-6}$. Thus, the process of controlling the thermal expansive coefficient of the microstructure is performed in order to have a thermal expansive coefficient similar to the thermal expansive coefficient of a substrate or dielectric layer that is to adhere to the microstructure. Recently, materials for a substrate for use with a flat panel display includes a wide variety of materials such as glass, glass-ceramics, metal, etc, and their thermal expansive coefficients varies according to the materials. The thermal expansive coefficient of glass which is most frequently used as a material for a substrate for use with a flat panel display panel is about $8.3\sim8.6\times10^{-6}$. Therefore, it is preferable to control the thermal expansive coefficient of the microstructure to $8.3\sim8.6\times10^{-6}$ in order to improve the characteristics of adhesion to the substrate.

A method of controlling a thermal expansive coefficient in accordance with the present invention is a process in which the microstructure manufactured as illustrated in FIG. 2 is heat-treated at 615° C. for about 1 hour. After the heat treatment, the thermal expansive coefficient of the microstructure is increased from $7.5\times10^{-6}$ to $8.3\sim8.6\times10^{-6}$.

Figure 4:
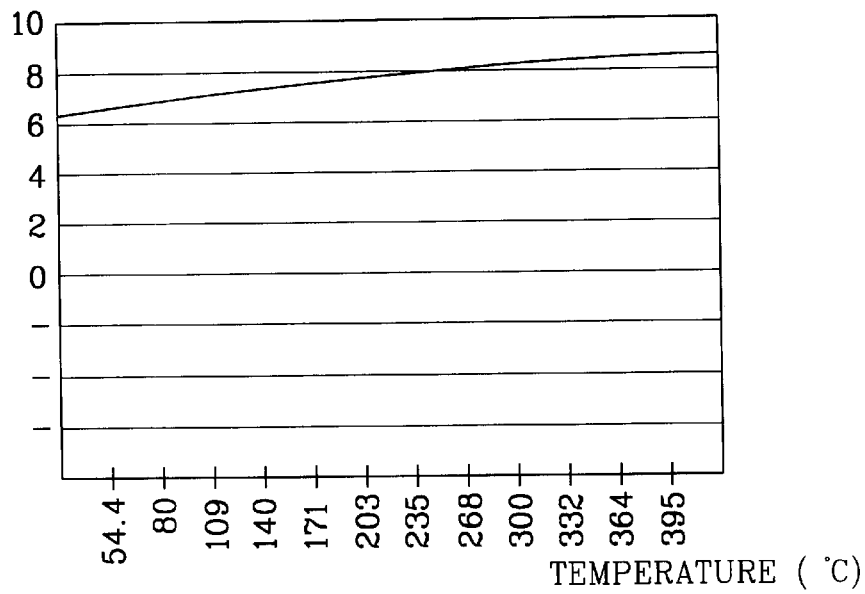
FIG. 4 is a graph illustrating a change in thermal expansive coefficient according to the temperature of a microstructure prior to heat treatment.
Figure 5:
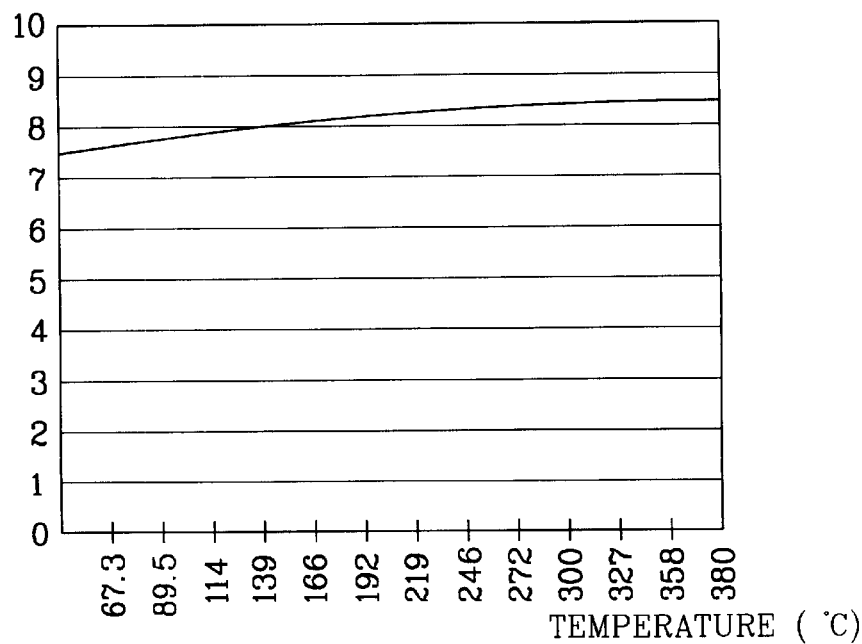
FIG. 5 is a graph illustrating a change in thermal expansive coefficient according to the temperature of a microstructure prior to heat treatment.

For reference, FIGS. 4 and 5 each illustrate a change in thermal expansive coefficient of a microstructure according to the temperature prior to controlling the thermal expansive coefficient and after controlling the thermal expansive coefficient. That is, as illustrated in FIG. 4, the thermal expansive coefficient of the microstructure prior to heat treatment is $6.5\times10^{-6}$ at 55.4° C., and it gradually increases as the temperature increases. For example, it is about $8.5\times10^{-6}$ at 395° C. Thus, the average thermal expansive coefficient is about $7.5\times10^{-6}$. On the contrary, as illustrated in FIG. 5, the thermal expansive coefficient of the microstructure after heat treatment is about $7.5\times10^{-6}$ at 67.3° C., and about $8.5\times10^{-6}$ at 380° C. Therefore, the average thermal expansive coefficient after heat treatment is increased to about $8.2\times10^{-6}$. It is possible to appropriately control the thermal expansive coefficient of the microstructure thus manufactured and the thermal expansive coefficient of the substrate to be adhered to the microstructure, in order to match the two thermal expansive coefficients. Since the thermal expansive coefficient of the microstructure can be matched with those of glass, a ceramic substrate, a metal substrate, etc., adhesion is easily performed.

The method of manufacturing a microstructure in accordance with the present invention is a negative etching method for removing the unexposed portion (D2) by structuring the same in a defective way. As a result of an experiment in accordance with the present invention, a hole With a diameter of 60 μm has been formed on a glass substrate with a thickness of 500 μm. In other words, the aspect ratio has been increased as compared to the positive etching in the conventional art.

In the method of manufacturing a microstructure in accordance with the present invention, the etching selectivity between the exposed portion and the unexposed portion is remarkably increased as compared to the conventional art, and thus it is possible to manufacture a microstructure with a high aspect ratio.

In addition, there is an advantage that since the selectivity between the exposed portion and the unexposed portion is high, a microstructure with high reliability can be manufactured by only one heat treatment and etching, thus making the process simple and requiring less time.

In addition, in the method of manufacturing a microstructure in accordance with the present invention, there is an advantage that the adhesion characteristics of the microstructure is improved by controlling the thermal expansive coefficient of the microstructure to be similar to that of an object to be adhered to the microstructure.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method of manufacturing a microstructure, comprising:

preparing a negative photosensitive substrate;

forming a mask pattern having a light transmission unit and a shading unit on the negative photosensitive substrate;

exposing portions of the negative photosensitive substrate to light through the mask pattern;

heat-treating the negative photosensitive substrate, wherein unexposed portions of the negative photosensitive substrate are defective after the heat-treating and the exposed portions of the negative photosensitive substrate are densified after the heat-treating; and etching and removing the unexposed portions of the negative photosensitive substrate thereby forming the microstructure.

2. The method of claim 1, wherein the exposing comprises applying an exposure energy of $20J/cm^2$ at a wavelength of about 310 nm.

3. The method of claim 1, wherein the step of heat-treating is performed at a temperature of about 600~650° C.

4. The method of claim 1, further comprising removing the mask pattern prior to heat-treating.

5. The method of claim 1, wherein the heat treatment is from about 50 minutes to 1 hour 30 minutes.

6. The method of claim 1, wherein the heat treatment changes the etch selectivity of the exposed portions of the negative photosensitive substrate into a highly etch sensitive material structure, and changes the structure of the unexposed portions into a less etch sensitive material structure.

7. The method of claim 1, wherein the removing of the unexposed portion of the negative photosensitive substrate comprises wet-etching using a HF solution.

8. The method of claim 1, further comprising changing the thermal expansive coefficient of the microstructure after removing the unexposed portions of the negative photosensitive substrate.

9. The method of claim 8, wherein the changing of the thermal expansive coefficient of the microstructure comprises altering the thermal expansive coefficient of the microstructure to correspond approximately with that of a thermal expansive coefficient of a substrate to be adhered to the microstructure.

10. The method of claim 9, wherein the substrate to be adhered comprises glass, glass-ceramic, or metal.

11. The method of claim 8, wherein the changing of the thermal expansive coefficient of the microstructure comprises a second heat treatment process.

12. The method of claim 11, wherein the second heat treatment process is performed at 615° C. for about one hour.

13. The method of claim 1, wherein the etching of the unexposed portions of the negative photosensitive substrate removes the unexposed portions of the negative photosensitive substrate and leaves the exposed portions of the negative photosensitive substrate to form the microstructure.

14. The method of claim 1, wherein the heat-treating comprises subjecting the negative photosensitive substrate to about 600° C. to 650° C. for about 50 to 90 minutes and further comprising a second heat treatment comprising subjecting the microstructure to about 615° C. for about one hour.

15. The method of claim 1, wherein exposing portions of the negative photosensitive substrate comprises:

applying an exposure energy of 20J/cm$^2$ at about 310 nm; and densifying the exposed portions of the negative photosensitive substrate.

16. A method of manufacturing a microstructure, comprising:

forming a mask pattern on a photosensitive substrate;

forming first portions with many structural defects that are easily etched and removed and second portions of the photosensitive substrate with very few structural defects, wherein the second portions are more compacted than the first portions; and removing the first portions and leaving the second portions to form the microstructure, wherein the forming of the first and second portions, comprises:

exposing the photosensitive substrate and the mask pattern to light, wherein the portions of the substrate exposed are subjected to about 20J/cm$^2$ of light;

removing the mask pattern; and heating-treating the photosensitive substrate at a temperature of about 600° C. to 650° C. for about 50 to 90 minutes, wherein the portions of the photosensitive substrate exposed to the light form the second portions and the portions that were under the mask pattern and not exposed to the light form the first portions.

17. The method of claim 16, wherein the first portions are masked by the mask pattern during formation and the second portions are exposed to about 20J/cm$^2$ of light during formation.

18. A method of manufacturing a microstructure, comprising:

preparing a photosensitive glass substrate;

forming a mask pattern having a light transmission unit and a shading unit on the photosensitive glass substrate;

exposing portions of the photosensitive glass substrate using the mask pattern;

heat-treating the photosensitive glass substrate; and etching and removing heat-treated unexposed portions of the photosensitive glass substrate, wherein the unexposed portions of the photosensitive substrate are defective after the heat-treating and the exposed portions of the photosensitive substrate are densified after the heat-treating.

* * * * *